US005569058A

United States Patent [19]

Gnade et al.

[11] Patent Number: 5,569,058

[45] Date of Patent: Oct. 29, 1996

[54] LOW DENSITY, HIGH POROSITY MATERIAL AS GATE DIELECTRIC FOR FIELD EMISSION DEVICE

[75] Inventors: Bruce Gnade, Dallas; Chih-Chen Cho, Richardson; Jules D. Levine, Dallas, all of Tex.

[73] Assignee: Texas Instruments Incorporated, Dallas, Tex.

[21] Appl. No.: 461,230

[22] Filed: Jun. 5, 1995

Related U.S. Application Data

[62] Division of Ser. No. 292,915, Aug. 19, 1994, Pat. No. 5,525,857.

[51] Int. Cl.[6] ................................ H04J 1/30; H04J 9/18

[52] U.S. Cl. ................................ 445/24; 445/50

[58] Field of Search ........................ 445/24, 50; 313/309, 313/336

[56] References Cited

U.S. PATENT DOCUMENTS

| | | | |
|---|---|---|---|
| 3,755,704 | 8/1973 | Spindt et al. | 313/309 |
| 4,652,467 | 3/1987 | Brinker et al. | 427/246 |
| 4,940,916 | 7/1990 | Borel et al. | 313/306 |
| 4,987,101 | 1/1991 | Kaanta et al. | 437/228 |
| 5,103,288 | 4/1992 | Sakamoto et al. | 357/71 |
| 5,194,780 | 3/1993 | Meyer | 315/169 |
| 5,225,820 | 7/1993 | Clerc | 340/752 |
| 5,393,712 | 2/1995 | Rostoker et al. | 437/238 |
| 5,430,300 | 7/1995 | Yue et al. | 445/51 |

*Primary Examiner*—P. Austin Bradley
*Assistant Examiner*—Jeffrey T. Knapp
*Attorney, Agent, or Firm*—Richard L. Donaldson; Rose Alyssa Keagy

[57] ABSTRACT

A porous dielectric material such as silica-based aerogel is used as the dielectric layer 48 between the gate and the cathode on the emitter plate 12 of a field emission device. Aerogel, which can have a relative dielectric constant as low as 1.03, is deposited over the resistive layer 44 of the emitter plate 12. Metal layer 49, functioning as the gate electrode, is subsequently deposited over the aerogel layer 48. The use of aerogel as a gate dielectric reduces power consumption. In a disclosed embodiment, aerogel layer 48 is comprised of sublayers **48*a*, 48*b*, and 48*c* of aerogels of differing densities, thereby providing better adhesion of the aerogel gate dielectric to both the resistive layer 44 and metal layer 49**. Methods of fabricating the aerogel gate dielectric are disclosed.

6 Claims, 3 Drawing Sheets

LOW DENSITY, HIGH POROSITY MATERIAL AS GATE DIELECTRIC FOR FIELD EMISSION DEVICE

This is a division, of application Ser. No. 08/292,915, filed Aug. 19, 1994, now U.S. Pat. No. 5,525,857.

TECHNICAL FIELD OF THE INVENTION

The present invention relates generally to field emission flat panel display devices and, more particularly, to the use of low density, high porosity, insulating material as the dielectric between the gate and the cathode.

BACKGROUND OF THE INVENTION

For more than half a century, the cathode ray tube (CRT) has been the principal electronic device for displaying visual information. The widespread usage of the CRT may be ascribed to the remarkable quality of its display characteristics in the realms of color, brightness, contrast and resolution. One major feature of the CRT permitting these qualities to be realized is the use of a luminescent phosphor coating on a transparent faceplate.

Conventional CRT's, however, have the disadvantage that they require significant physical depth, i.e., space behind the actual display surface, making them bulky and cumbersome. They are fragile and, due in part to their large vacuum volume, can be dangerous if broken. Furthermore, these devices consume significant amounts of power.

The advent of portable computers has created intense demand for displays which are light-weight, compact and power efficient. Since the space available for the display function of these devices precludes the use of a conventional CRT, there has been significant interest in efforts to provide satisfactory flat panel displays having comparable or even superior display characteristics, e.g., brightness, resolution, versatility in display, power consumption, etc. These efforts, while producing flat panel displays that are useful for some applications, have not produced a display that can compare to a conventional CRT.

Currently, liquid crystal displays are used almost universally for laptop and notebook computers. In comparison to a CRT, these displays provide poor contrast, only a limited range of viewing angles is possible, and, in color versions, they consume power at rates which are incompatible with extended battery operation. In addition, color screens tend to be far more costly than CRT's of equal screen size.

As a result of the drawbacks of liquid crystal display technology, thin film field emission display technology has been receiving increasing attention by industry. Flat panel displays utilizing such technology employ a matrix-addressable array of pointed, thin-film, cold field emission cathodes in combination with an anode comprising a phosphor-luminescent screen.

The phenomenon of field emission was discovered in the 1950's, and extensive research by many individuals, such as Charles A. Spindt of SRI International, has improved the technology to the extent that its prospects for use in the manufacture of inexpensive, low-power, high-resolution, high-contrast, full-color flat displays appear to be promising.

Advances in field emission display technology are disclosed in U.S. Pat. No. 3,755,704, "Field Emission Cathode Structures and Devices Utilizing Such Structures," issued 28 August 1973, to C. A. Spindt et al.; U.S. Pat. No. 4,940,916, "Electron Source with Micropoint Emissive Cathodes and Display Means by Cathodoluminescence Excited by Field Emission Using Said Source," issued 10 July 1990 to Michel Borel et al.; U.S. Pat. No. 5,194,780, "Electron Source with Microtip Emissive Cathodes," issued 16 March 1993 to Robert Meyer; and U.S. Pat. No. 5,225,820, "Microtip Trichromatic Fluorescent Screen," issued 6 July 1993, to Jean-Frédéric Clerc. These patents are incorporated by reference into the present application.

The Clerc ('820) patent discloses a field emission flat panel display having a glass substrate on which are arranged a matrix of conductors. In one direction of the matrix, conductive columns comprising the cathode electrode support the microtips. In the other direction, above the column conductors, are perforated conductive rows comprising the gate electrode. The row and column conductors are separated by an insulating layer having holes permitting the passage of the microtips, each intersection of a row and column corresponding to a pixel. As stated in the Clerc patent, silica is commonly used as the insulating layer material.

One area for improvement of field emission displays of the current technology is in the material used as the insulating layer separating the cathode and gate electrodes. Since one of the main advantages of field emission displays is low power consumption, any reduction in power consumption further enhances this competitive advantage. The emitter portion of the display is responsible for the largest portion of power consumption by the display. The emitter power consumption is directly related to the dielectric constant (switching capacitance) of the insulating layer between the cathode and gate electrodes. This problem becomes more pronounced at smaller hole geometries because as the hole diameter decreases, the thickness of the dielectric layer must be reduced to maintain the tip aspect ratio. Thinning the dielectric layer increases the capacitance, if the dielectric constant remains the same.

Probably the most common semiconductor dielectric material is silicon dioxide, which has a relative dielectric constant of about 3.9. In contrast, air (including partial vacuum) has a relative dielectric constant of just over 1.0. Consequently, many capacitance reducing schemes have been devised to at least partially replace solid dielectrics with air by semiconductor and electronics manufacturers in designing various integrated circuits.

U.S. Pat. No. 4,987,101, issued to Kaanta et al., on Jan. 22, 1991, describes a method for fabricating gas (air) dielectrics which comprises depositing a temporary layer of removable material between supports (such as conductors), covering this with a capping insulator layer, opening access holes in the cap, extracting the removable material through these access holes, then closing the access holes. This method can be cumbersome, partially because it requires consideration of access hole locations in the design rules and alignment error budget during circuit design, as well as requiring extra processing steps to create and then plug the holes. This method may also create large void areas which have essentially no means of handling mechanical stress and heat dissipation.

U.S. Pat. No. 5,103,288, issued to Sakamoto, on Apr. 7, 1992, describes a multilayered wiring structure which decreases capacitance by employing a porous dielectric with 50% to 80% porosity (porosity is the percentage of a structure which is hollow) and pore sizes of roughly 5 nm to 50 nm. This structure is typically formed by depositing a mixture of an acidic oxide and a basic oxide, heat treating to precipitate the basic oxide, and then dissolving out the basic oxide. Dissolving all of the basic oxide out of such a structure may be problematic, because small pockets of the basic oxide may not be reached by the leaching agent. Furthermore, several of the elements described for use in the basic oxides (including sodium and lithium) are generally considered contaminants in the semiconductor industry, and as such are usually avoided in a production environment. Creating only extremely small pores (less than 10 nm) may be difficult using this method.

Another method of forming porous dielectric films on semiconductor substrates (the term "substrate" is used broadly herein to include any layers formed prior to the conductor/insulator level of interest) is described in U.S. Pat. No. 4,652,467, issued to Brinker et al., on Mar. 24, 1987. This patent teaches a sol-gel technique for depositing porous films with controlled porosity and pore size (diameter), wherein a solution is deposited on a substrate, gelled, and then cross-linked and densified by removing the solvent through evaporation, thereby leaving a porous dielectric. This method has as a primary objective the densification of the film, which teaches away from low dielectric constant application. Dielectrics formed by this method are typically 15% to 50% porous, with a permanent film thickness reduction of at least 20% during drying. The higher porosities (e.g. 40%–50%) can only be achieved at pore sizes which are generally too large for such microcircuit applications. These materials are usually referred to as xerogels, although the final structure is not a gel, but an open-pored (the pores are generally interconnected, rather than being isolated cells) porous structure of a solid material.

Today the material generally used as the gate dielectric in field emission display devices is silicon dioxide ($SiO_2$) or doped $SiO_2$ to control the stress. As the thickness of the gate dielectric for flat panel displays is reduced to accommodate smaller hole diameters, the capacitive coupling present with the use of the standard $SiO_2$ gate dielectric increases and adversely affects proper device operation. The us of organic dielectrics such as polyimide and amorphous Teflon have been attempted, but they require keeping the processing temperature below 300° C. Since current upper processing temperatures for flat panel displays is around 400° C. to 450° C. these organic dielectrics cannot be used. Furthermore, organic materials are subject to outgassing at the very low pressures, typically of the order of $10^{-7}$ torr, maintained in field emission flat panel display devices. Such outgassing increases the pressure within the device and degrades the performance of the emitters.

One way to diminish power consumption is to decrease the dielectric constant of the insulating gate dielectric. What is needed is a material which has a lower dielectric constant than $SiO_2$. More ideally, what is needed is a low dielectric constant material that is vacuum compatible and able to withstand temperatures greater than 400° C.

SUMMARY OF THE INVENTION

In accordance with the principles of the present invention, there is disclosed herein electron emission apparatus comprising an insulating substrate having a first layer thereon, and an insulating layer over the first layer, the insulating layer comprising a porous material. The apparatus further comprises a conductive layer on the insulating layer, the conductive layer having a plurality of apertures formed therethrough and through the insulating layer, and microtip emitters on the first layer within the apertures in the conductive layer.

In a disclosed embodiment, the insulating layer comprises a silica-based aerogel having a relative dielectric constant of less than 3.0 and preferably less than 2.0. In a second disclosed embodiment, the insulating layer comprises a plurality of sub-layers, wherein adjacent ones of the sub-layers differ in their relative densities.

Further in accordance with the principles of the present invention there is disclosed herein a method of fabricating an electron emission apparatus comprising the steps of providing a first layer on an insulating substrate, forming an insulating layer over the first layer, forming a conductive layer on the insulating layer, forming a plurality of apertures through the conductive layer and through the insulating layer, and forming a microtip emitter on the first layer within each of the apertures in the conductive layer, wherein the insulating layer comprises a porous material.

BRIEF DESCRIPTION OF THE DRAWING

The foregoing features of the present invention may be more fully understood from the following detailed description, read in conjunction with the accompanying drawings, wherein.

DESCRIPTION OF THE PREFERRED EMBODIMENT

Figure 1:
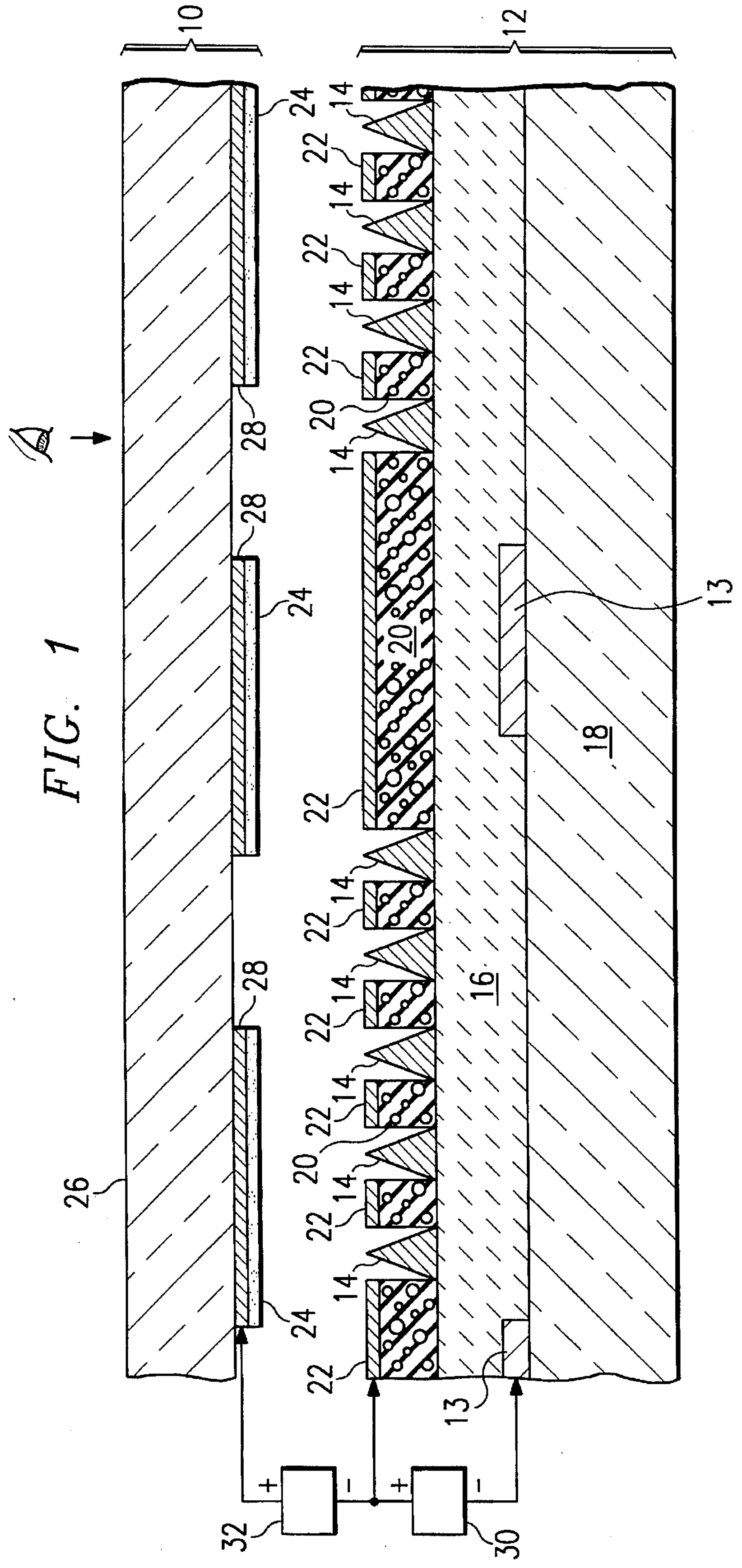
FIG. 1 illustrates in cross section a portion of a field emission flat panel display device according to the prior art.

Referring initially to FIG. 1, there is shown, in cross-sectional view, a portion of an illustrative, prior art field emission flat panel display device. In this embodiment, the field emission device comprises an anode plate having an electroluminescent phosphor coating facing an emitter plate, the phosphor coating being observed from the side opposite to its excitation.

More specifically, the illustrative field emission device of FIG. 1 comprises a cathodoluminescent anode plate 10 and an electron emitter (or cathode) plate 12. The cathode portion of emitter plate 12 includes conductors 13 formed on an insulating substrate 18, a resistive layer 16 also formed on substrate 18 and overlaying conductors 13, and a multiplicity of electrically conductive microtips 14 formed on resistive layer 16. In this example, conductors 13 comprise a mesh structure, and microtip emitters 14 are configured as a matrix within the mesh spacings.

A gate electrode comprises a layer of an electrically conductive material 22 which is deposited on an insulating layer 20 which overlays resistive layer 16. Microtip emitters 14 are in the shape of cones which are formed within apertures through conductive layer 22 and insulating layer 20. The thicknesses of gate electrode layer 22 and insulating layer 20 are chosen in such a way that the apex of each microtip 14 is substantially level with the electrically conductive gate electrode layer 22. Conductive layer 22 is arranged as rows of conductive bands across the surface of substrate 18, and the mesh structure of conductors 13 is arranged as columns of conductive bands across the surface of substrate 18, thereby permitting selection of microtips 14 at the intersection of a row and column corresponding to a pixel.

Anode plate 10 comprises regions of a transparent, electrically conductive material 28 deposited on a transparent planar support 26, which is positioned facing gate electrode 22 and parallel thereto, the conductive material 28 being deposited on the surface of support 26 directly facing gate electrode 22. In this example, the regions of conductive material 28, which comprise the anode electrode, are in the form of electrically isolated stripes comprising three series of parallel conductive bands across the surface of support 26, as taught in the Clerc ('820) patent. (No true scaling information is intended to be conveyed by the relative sizes and positioning of the elements of anode plate 10 and the elements of emitter plate 12 as depicted in FIG. 1.) Anode plate 10 also comprises a cathodoluminescent phosphor coating 24, deposited over conductive regions 28 so as to be directly facing and immediately adjacent gate electrode 22.

One or more microtip emitters 14 of the above-described structure are energized by applying a negative potential to conductors 13, functioning as the cathode electrode, relative to the gate electrode 22, via voltage supply 30, thereby inducing an electric field which draws electrons from the apexes of microtips 14. The freed electrons are accelerated toward the anode plate 10 which is positively biased by the application of a substantially larger positive voltage from voltage supply 32 coupled between the gate electrode 22 and conductive regions 28 functioning as the anode electrode. Energy from the electrons attracted to the anode conductors 28 is transferred to the phosphor coating 24, resulting in luminescence. The electron charge is transferred from phosphor coating 24 to conductive regions 28, completing the electrical circuit to voltage supply 32.

In accordance with the principles of the present invention, emitter plate 12 is fabricated having, as insulating layer 20, a low density, high porosity, electrically insulating material of a low dielectric constant. Such a material may illustratively comprise an aerogel (having pore diameters of less than 80 nm and preferably of 2 nm to 25 nm) or, if small pore size is not a critical requirement, may comprise a xerogel. Aerogel can provide a low dielectric constant of less than 3.0 and possibly less than 2.0. Illustrative processes for forming an aerogel layer on emitter plate 12 are described in the paragraphs which follow.

A method of fabricating an emitter plate for use in a field emission flat panel display device in accordance with a first embodiment incorporating the principles of the present invention, comprises the following steps, considered in relation to FIGS. 2A through 2D. The relationship between the elements of FIGS. 2A through 2D and those elements of FIG. 1 should be apparent from the disclosure of the materials of the various layers. The widths and thicknesses of the various layers and elements of FIGS. 2A through 2D are highly exaggerated and distorted, and no true scaling information can be perceived therefrom.

Figure 2A:
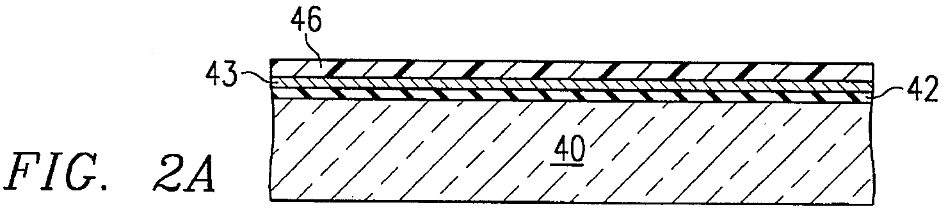
FIGS. 2A through 2D illustrate steps in a process for fabricating the gate dielectric of the emitter assembly-in accordance with a first embodiment of the present invention.
Figure 2B:
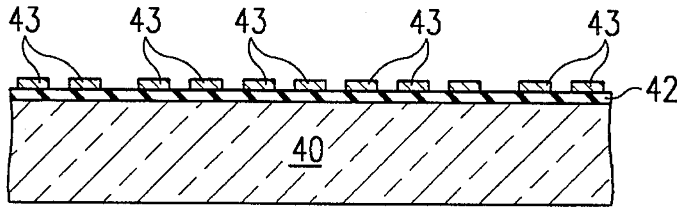

Referring initially to FIG. 2A, a glass substrate 40 is coated with a thin insulating layer 42; typically $SiO_2$, which may be sputter deposited to a thickness of 50 nm. A conductive layer 43 which may typically comprise aluminum, molybdenum, chromium or niobium, is deposited by either evaporation or sputtering over layer 42 to a thickness of approximately 100–500 nm. A layer 46 photoresist, illustratively type AZ-1350J sold by Hoescht-Celanese of Somerville, N.J., is spun on over layer 43 to a thickness of approximately 1000 nm, resulting in the structure shown FIG. 2A.

A patterned mask (not shown) is disposed over the light-sensitive photoresist layer 46. This exposes desired regions of the photoresist to light. The mask used in this step defines the cathode mesh structures 13 described in relation to FIG. 1, and as disclosed in the Meyer ('780) patent. In the case of this illustrative positive photoresist, the exposed regions are removed during the developing step, which may comprise soaking the assembly in a caustic or basic chemical such as Hoescht-Celanese AZ-developer. The developer removes the unwanted photoresist regions which were exposed to light. The exposed regions of conductive layer 43 are then removed, typically by a reactive ion etch (RIE) process using carbon tetrafluoride ($CF_4$). The remaining photoresist layer 46 is removed by a wet etch process using acetone or toluene as the etchant, leaving the structure shown in FIG. 2B. The portions of layer 43 which remain comprise the above-described cathode mesh structures 13.

Figure 2C:
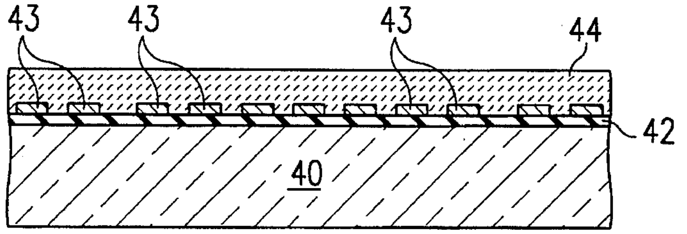

A resistive layer 44 is added by sputtering amorphous silicon onto $SiO_2$ layer 42 and the remaining portions of layer 43 to a thickness of approximately 500–2000 nm; alternatively the amorphous silicon may be deposited by a chemical vapor deposition (CVD) process. FIG. 2C illustrates the emitter structure having amorphous silicon layer 44 at the current stage of the fabrication process.

In accordance with the present invention, a layer 48 comprising an aerogel is applied over resistive layer 44 at the next step. In order to apply the aerogel in accordance with the preferred embodiment, a precursor is first prepared. The precursor is the starting chemical for aerogel. The precursor is prepared by mixing tetraethoxysilane (TEOS) stock, ethanol, water and HCl in an approximate molar ratio of 1:3:1:0.0007, under constant reflux at 60° C. for 1.5 hours. Next, 0.05M ammonium hydroxide is added to the precursor at about 0.1 ml for each ml of TEOS stock to initiate the gelling process. The solution is then applied to the assembly. Care should be taken to ensure that the mixture does not dry prematurely, preferably by immersing the assembly in liquid or in a saturated atmosphere at all times prior to the drying stage. The precursor solution may preferably be gelled on the substrate, a process which typically takes from 1 minute to 12 hours, depending on the solution and method of gelling. Aging of the mixture is preferably accomplished by letting the device sit in a saturated ethanol atmosphere for approximately 24 hours at about 37° C. This time can be reduced significantly by increasing the temperature during the aging process.

The process of drying a wet gel involves evaporation of pore fluid along the current drying front. Many techniques for drying wet gel are discussed in a co-assigned U.S. patent application Ser. No. 08/247,195, Method of Making a Semiconductor Device Using a Low Dielectric Constant Material, filed May 20, 1994, now U.S. Pat. No. 5,470,802. This application also discloses other materials and processing parameters which can be used to produce aerogel layer 48. One method of drying removes a solvent from a wet gel under supercritical pressure and temperature conditions. By removing the solvent in the supercritical region, vaporization of the liquid solvent does not take place;instead, the fluid undergoes a constant change in density during the operation, changing from a compressed liquid to a superheated vapor with no distinguishable state boundary. Unfortunately, supercritical drying requires high pressure and is therefore difficult to accomplish in a high-production environment. Also, supercritically-dried aerogel tends to be hydrophilic. However, hydrophilic films may be acceptable if a thin $SiO_2$ or SiN coating is applied on the xerogel film.

Figure 2D:
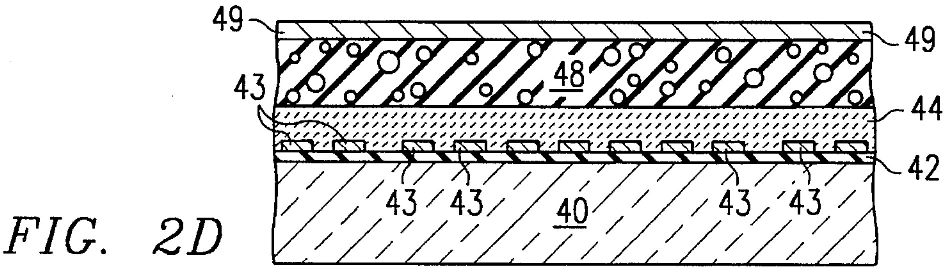

A layer 49 of a metal, such as niobium, is deposited by sputtering or e-beam evaporation on top of the aerogel layer 48. Prior to this deposition, a thin layer of $SiO_2$ (not shown) may be sputtered on top of aerogel layer 48 to improve adhesion. The thickness of metal layer 49 is approximately 1000 Å, while aerogel layer 48 is approximately 1 to 1.5 microns, depending on the size of the microtip emitter apertures in conductive layer 22 (of FIG. 1 ). Therefore the ratio of aerogel layer 48 to metal layer 49 is about 10–15 to 1. In its final form, metal layer 49 will comprise the gate electrode of the emitter plate. The resulting structure is shown in FIG. 2D.

Referring once again to the illustration of FIG. 1, the Borel et al. ('161) patent discloses an etching process for forming the holes 34 in the gate electrode material coating 22 and the insulating layer 20. The described process includes a reactive ionic etching of conductive coating 22 using a sulfur hexafluoride ($SF_6$) plasma. Holes 34 are formed in the insulating layer 20 by chemical etching, e.g., by immersing the structure in a hexafluoric acid and ammonium flouride etching solution. The microtip emitters 14 are formed by first depositing a nickel coating by vacuum evaporation at a glancing angle with respect to the surface of the structure, thus ensuring that the holes 34 do not become blocked. This is followed by the deposition of a molybdenum coating on the complete structure at a normal incidence, thereby forming the cone-shaped emitters 14 within holes 34. The nickel coating is then selectively dissolved by an electrochemical process so as to expose the perforated conductive coating 22 and bring about the appearance of the electron emitting microtips 14.

Figure 3:
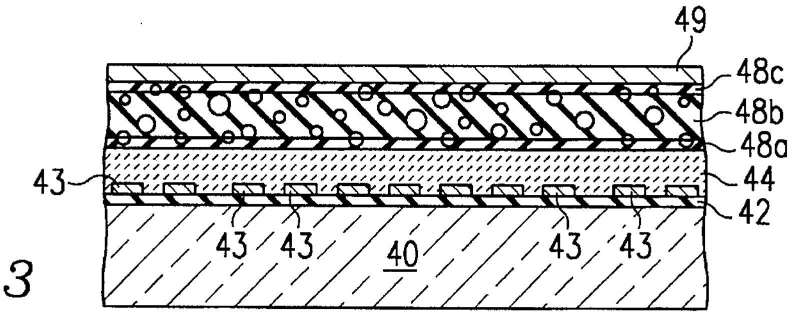
FIG. 3 illustrates the structure of the gate dielectric of the emitter assembly in accordance with a second embodiment of the present invention.

In an alternate embodiment of the present invention, shown in FIG. 3, the aerogel layer 48 is formed by creating a plurality of aerogel layers of varying porosity. By varying the composition of the solutions, gelling conditions, drying temperature, composition of the solvents in the wet gel, or a combination of these approaches, the porosity of subregions of aerogel layer 48 can be tailored individually. At least two methods can be used to create aerogel layer regions of differing porosities. A first application of a gel precursor solution 48*a* is deposited in accordance with the steps described above in relation to FIG. 2D. Next a second application of a gel precursor solution 48*b* (which may be identical to the first precursor solution) is deposited and gelled over first wet gel sublayer 48*a*. A third application of a gel precursor solution 48*c* (which may be identical to the first precursor solution) is then deposited and gelled over second wet gel sublayer 48*c*. By subjecting the first, second and third sublayers to different gelling/aging conditions, the respective porosities of adjacent layers may be varied. Alternatively, different solvent ratios may be used in the precursor solutions to adjust the respective porosities.

Figure 4:
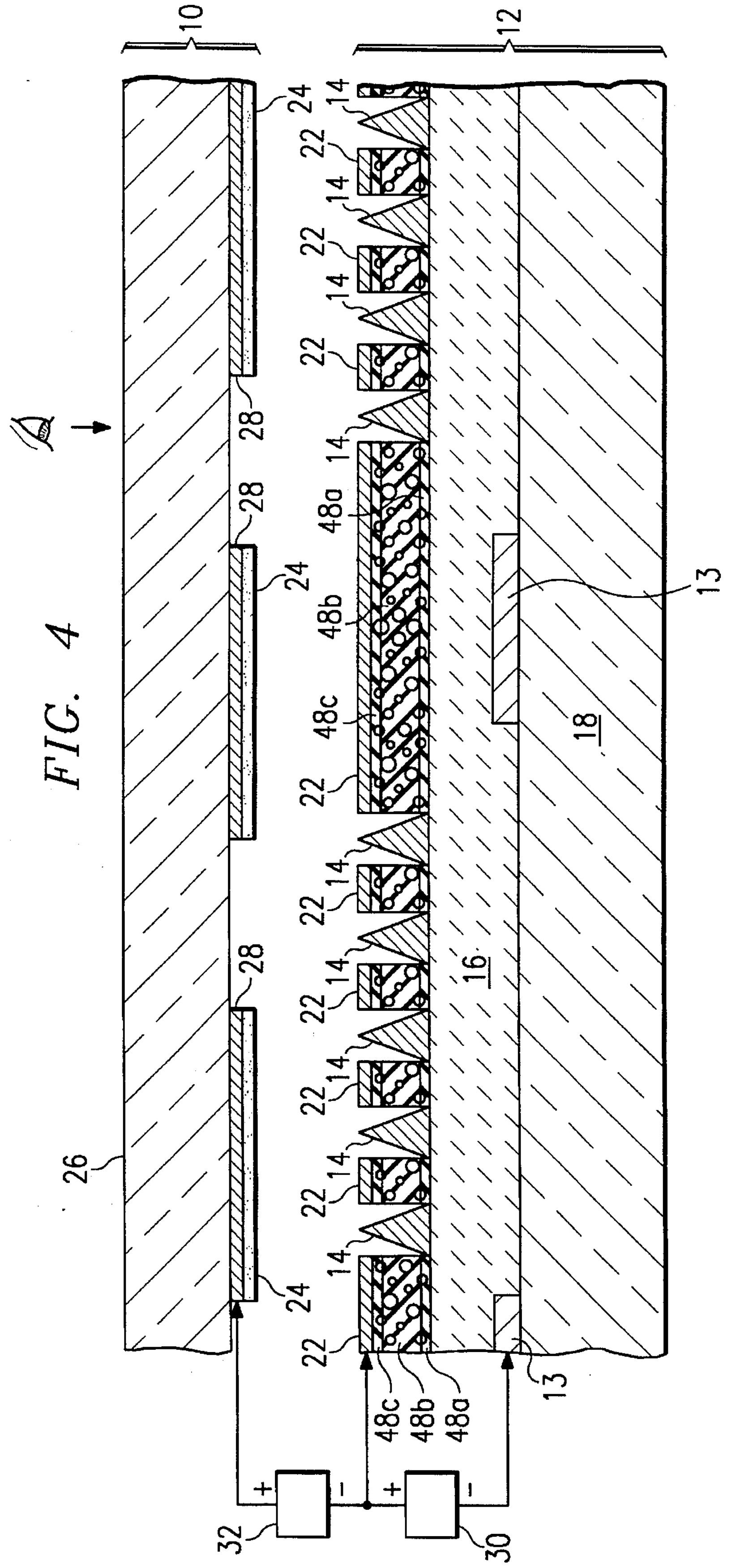
FIG. 4 illustrates in cross section a portion of a field emission flat panel display device according to an alternative embodiment of the present invention.

In accordance with still another illustration of the embodiment of FIG. 3, the sublayers 48*a*, 48*b* and 48*c* may comprise different materials, rather than different densities of a single material, e.g., silica aerogel. In such a case, sublayers 48*a* and 48*c* may comprise a material which improves the adhesion of an aerogel sublayer 48*b* with the gate and cathode layers, and which prevents outgassing from sublayer 48*b*. An example of the FED structure of FIG. 1 having aerogel sublayers 48*a*, 48*b*, 48*c* is shown in FIG. 4. The elements in FIG. 4 which are substantially similar to elements shown in FIG. 1 and described above are numbered the same in both drawings.

Several other variations in the above processes, such as would be understood by one skilled in the art to which it pertains, are considered to be within the scope of the present invention. For example, a hard mask, such as aluminum or gold, may replace photoresist layers 46 and 54 of the above processes.

A field emission flat panel display device, as disclosed herein, including the use of aerogel as the gate dielectric, and the methods disclosed herein for preparing the emitter plate and applying, the aerogel, overcome limitations and disadvantages of the prior art display devices and methods. The use of aerogel instead of $SiO_2$ reduces total power consumption up to 30% thereby enhancing the competitive advantage of these flat panel displays.

Since aerogel is of lower density than $SiO_2$, stress can also be lower. The current method of forming gate dielectric 48 involves using a chemical vapor deposition (CVD) process to lay consecutive layers of a first doped $SiO_2$ (creating a layer of phosphate silicate glass (PSG)), a second undoped $SiO_2$, then a third doped $SiO_2$. This layering technique is done to control the stress and thereby keep layer 48 from cracking or to keep metal layer 49 from peeling off of layer 48. Thus the performance and reliability of the flat panel display is enhanced.

Another advantage of using aerogel as the gate dielectric is that it is stable at flat panel display process temperatures. The silica-based aerogels are physically stable to temperatures as high as 700° C. Therefore, the aerogel gate dielectric is not affected when the flat panel display is pumped down to create a vacuum at temperatures ranging from 400° C. to 450° C. Finally, it is noted that a new material is not being introduced, just a new form of $SiO_2$. Therefore new process chemistries do not have to be invented to manufacture flat panel displays. For example, $CF_4$ can still be used to etch layer 48; however there will obviously be a difference in etch rate.

While the principles of the present invention have been demonstrated with particular regard to the structures and methods disclosed herein, it will be recognized that various departures may be undertaken in the practice of the invention. The scope of the invention is not intended to be limited to the particular structures and methods disclosed herein, but should instead by gauged by the breadth of the claims which follow.

What is claimed is:

1. A method of fabricating an electron emission apparatus comprising the steps of:

forming a conductive mesh structure on an insulating substrate;

providing a resistive layer on said insulating substrate;

forming an insulating layer over said resistive layer, said insulating layer comprising an aerogel;

forming a conductive layer on said insulating layer;

forming a plurality of apertures through said conductive layer and through said insulating layer; and forming a microtip emitter on said resistive layer within each of said apertures in said conductive layer.

2. The method in accordance with claim 1 wherein the material of said insulating layer comprises a silica-based aerogel.

3. The method in accordance with claim 1 wherein the material of said insulating layer has a relative dielectric constant of less than 3.0.

4. The method in accordance with claim 1 wherein said insulating layer comprises a plurality of sub-layers, wherein adjacent ones of said sub-layers differ in their relative densities.

5. A method of fabricating an emitter plate for use in a field emission device, said method comprising the steps of:

providing an insulating substrate;

depositing a first conductive layer on a surface of said substrate;

coating said first conductive layer with photoresist;

applying a patterned mask over said photoresist and developing said photoresist to remove selected portions of said first conductive layer;

removing any remaining photoresist;

depositing a resistive layer on a surface of said substrate;

depositing an insulating layer of a porous material over said resistive layer;

depositing a second conductive layer over said insulating layer;

forming apertures in said second conductive layer and through said insulating layer; and forming cone-shaped microtips within said apertures on said resistive layer;

wherein said step of depositing an insulating layer of a porous material over said emitter plate comprises the step of depositing a layer of a silica-based aerogel having a relative dielectric constant of less than 3.0.

6. The method in accordance with claim 5 wherein said step of depositing an insulating layer of a porous material over said emitter plate comprises the step of depositing a plurality of sub-layers of a porous material, wherein adjacent ones of said sub-layers differ in their relative densities.

* * * * *